US008593661B2

(12) United States Patent
Shimizu

(10) Patent No.: US 8,593,661 B2
(45) Date of Patent: Nov. 26, 2013

(54) IMAGE OUTPUT APPARATUS INCLUDING TRANSMISSION UNITS, IMAGE OUTPUT APPARATUS CONTROL METHOD, PROGRAM, ELECTRONIC DOCUMENT MANAGEMENT SYSTEM

(75) Inventor: Takayuki Shimizu, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1510 days.

(21) Appl. No.: 11/765,791

(22) Filed: Jun. 20, 2007

(65) Prior Publication Data

US 2008/0005176 A1    Jan. 3, 2008

(30) Foreign Application Priority Data

Jun. 29, 2006    (JP) ................................ 2006-180373

(51) Int. Cl.
     *G06F 3/12*      (2006.01)
     *G06K 15/00*    (2006.01)

(52) U.S. Cl.
     USPC ........................................ 358/1.15; 358/1.16

(58) Field of Classification Search
     USPC .............. 358/1.15, 1.1, 1.9, 1.12, 1.13, 1.16; 709/201, 203, 211, 219
     See application file for complete search history.

(56) References Cited

U.S. PATENT DOCUMENTS

| 5,655,152 | A | * | 8/1997 | Ohnishi et al. .................. 710/36 |
| 7,307,746 | B2 | | 12/2007 | Inoue |
| 2004/0001226 | A1 | | 1/2004 | Ohtuka |
| 2005/0210032 | A1 | * | 9/2005 | Machida ........................ 707/10 |

FOREIGN PATENT DOCUMENTS

| EP | 1531406 A2 | 5/2005 |
| JP | 2004-118243 A | 4/2004 |
| KR | 2003-0081135 A | 10/2003 |
| KR | 2005-0049063 A | 5/2005 |

OTHER PUBLICATIONS

Extended search report issued in corresponding European application No. 07111294.0-1228/1874029, dated Oct. 31, 2008.
Korean Office Action issued in corresponding Japanese application No. 10-2007-0065881 dated Nov. 19, 2008. No English translation available.

* cited by examiner

*Primary Examiner* — Gabriel Garcia
(74) *Attorney, Agent, or Firm* — Rossi, Kimms & McDowell LLP

(57) ABSTRACT

A document management server can maintain consistency between log image data of an input job and the job document ID of log information of an output job. For this purpose, an image output apparatus includes a registration unit configured to register image data generated based on the job in a storage unit, a first transmission unit configured to transmit the registered image data and input log information to a job log management server, a second transmission unit configured to transmit output log information to the job log management server, and a third transmission unit configured to transmit the image data to the job log management server.

8 Claims, 14 Drawing Sheets

FIG. 9

```xml
<?xml version="1.0" encoding="UTF-16"?>
<!-- Sample-->
<logInfomation xmlns : xlink="http://www.w3.org/1999/xlink">
    <deviceInformation>
        <deviceName>My Device</deviceName>
        <productName>Canon iR6800</productName>
        <serialNumber>abc00001</serialNumber>
        <location>35F</location>
    </deviceInformation>
    <userInformation>
        <departmentID>12345</departmentID>
        <userName>shimizu</userName>
        <domainName>domain1</domainName>
    </userInformation>
    <jobInformation>
        <documentID>00000003</documentID>
        <documentFlag>no<documentFlag>
        <jobType>fax-send</jobType>
        <jobName>My Document</jobName>
        <pageNum>2</pageNum>
        <copies>1</copies>
        <startDateTime>2004/06/11 13:44:58</startDateTime>
        <endDateTime>2004/06/11 13:45:14</endDateTime>
        <result>ok</result>
    </jobInformation>
</logInfomation>
```

IMAGE OUTPUT APPARATUS INCLUDING TRANSMISSION UNITS, IMAGE OUTPUT APPARATUS CONTROL METHOD, PROGRAM, ELECTRONIC DOCUMENT MANAGEMENT SYSTEM

BACKGROUND OF THE INVENTION

1. Field of the Invention

The present invention relates to an image output apparatus and, more particularly, to a job management technique executed by the image output apparatus.

2. Description of the Related Art

There has conventionally been proposed a network document management system aimed at preventing information leakage. This system saves image data and log information in a document management server in correspondence with a job such as copy, print, scan, or FAX executed by, for example, a digital multi-function peripheral. The document management server can be searched and browsed by a document management client. As shown in FIG. 14, a document management client 1400, document management server 1401, and digital multi-function peripheral 1406 are connected to each other via a network 1407.

The document management client 1400 is a client in a network document management system, and searches for and browses a document managed by the document management server 1401.

The document management server 1401 comprises an attribute management server unit 1402, attribute database file 1403, volume server unit 1404, and volume file 1405. The attribute management server unit 1402 manages image data which is stored in the volume file 1405 (to be described later) and corresponds to each job. The attribute management server unit 1402 manages the inclusion relationship of a folder, document, and page, and their attributes using RDBMS (Relational DataBase Management System). For example, the attribute management server unit 1402 stores a folder attribute, document attribute, page attribute, job log information, and the like in the attribute database file 1403. The volume server unit 1404 is a server for managing actual image data made to correspond to each page by the attribute management server unit 1402. The volume server unit 1404 stores image data in the volume file 1405.

The digital multi-function peripheral 1406 is an image output apparatus having a plurality of functions such as copy, scan, print, and FAX. Upon executing a job to input an image (e.g., copy, print, or scan; to be referred to as an input job hereinafter), the digital multi-function peripheral 1406 generates log image data together with log information of the job, and transmits it to the document management server 1401. Upon executing a job to output an image generated by an input job (e.g., printing or FAX transmission of a scanned document; to be referred to as an output job hereinafter), the digital multi-function peripheral 1406 does not generate log image data of the job. Instead, the digital multi-function peripheral 1406 generates log information containing the job document ID of log image data of a corresponding input job, and transfers it to the document management server. This can decrease the capacity of the storage area of the volume file 1405 and reduce the data transfer load on the network 1407.

For example, job log information contains the following pieces of information:

Device information: a device name, serial number, and the like

User information: a user name, department ID, and the like

Job information: a job document ID, log image flag, job name, start/end date & time, the number of pages, the number of copies, job result, and the like The job document ID is a unique value assigned to log image data of an input job. The log image flag represents whether log image data exists. Log image data of a job may be image data generated by an input job, or may be converted into a predetermined resolution.

For example, Japanese Patent Laid-Open No. 2004-118243 discloses a technique of creating a print log by a print server based on print data and user information transmitted from a client, and creating browsing data for use in search, browse, and reprint instructions from an administrator. Simultaneously when transmitting print data to the printer server, the client transmits key information which allows the administrator to uniquely specify a user in subsequent browsing and searching.

However, the above-mentioned management technique suffers the following problems. That is, the maximum number of documents which can be saved in one data source of the document management server is limited, so data sources of the document management server must be periodically backed up and used while switching them. According to this management technique, however, log information and log image data are registered in the management server for an input job, but no log image data is registered for an output job. When log information of an output job is transferred after switching the data source of the document management server, log image data corresponding to the job document ID of the log information does not exist. In other words, no consistency can be maintained between log image data of an input job and the job document ID of log information of an output job.

When deleting a data source whose retention period has expired, log image data indicated by the job document ID of log information of an output job saved in another data source may also be deleted. If a problem such as information leakage occurs in a case of saving log information and log image files in a plurality of data sources, all the data sources must be searched, complicating the operation.

SUMMARY OF THE INVENTION

The present invention has been made to overcome the conventional drawbacks, and has as its object to solve at least one of the above-described problems while decreasing the capacity of the storage area of log information and log image data and reducing the data transfer load.

According to one aspect of the present invention, an image output apparatus which has a network interface and outputs an image generated on the basis of a job to input an image, comprises a registration unit which, when a new job is received, registers image data generated on the basis of the job in a storage unit; a first transmission unit which transmits the registered image data and input log information describing identification information to identify the registered image and representing that a job has been input, so as to register the image data and the input log information in a job log management server on a network; a second transmission unit which, when performing an output process by inputting a request to output the image data registered in the storage unit, transmits output log information describing identification information to identify an output image, so as to register the output log information in the job log management server; and a third transmission unit which, when a request for image data represented by identification information is received from the job log management server as a result of transmission by the second transmission unit, transmits the image data represented by the identification information in the storage unit, so as to register the image data in the job log management server.

According to another aspect of the present invention, a method of controlling an image output apparatus which has a network interface and outputs an image generated on the basis of a job to input an image, the method comprises a registration step of, when a new job is received, registering image data generated on the basis of the job in a storage unit; a first transmission step of transmitting the registered image data and input log information describing identification information to identify the registered image and representing that a job has been input, so as to register the image data and the input log information in a job log management server on a network; a second transmission step of, when performing an output process by inputting a request to output the image data registered in the storage unit, transmitting output log information describing identification information to identify an output image, so as to register the output log information in the job log management server; and a third transmission step of, when a request for image data represented by identification information is received from the job log management server as a result of transmission in the second transmission step, transmitting the image data represented by the identification information in the storage unit, so as to register the image data in the job log management server.

According to still another aspect of the present invention, a program of controlling an image output apparatus which has a network interface and outputs an image generated on the basis of a job to input an image, the program comprises a program code for executing a registration step of, when a new job is received, registering image data generated on the basis of the job in a storage unit; a program code for executing a first transmission step of transmitting the registered image data and input log information describing identification information to identify the registered image and representing that a job has been input, so as to register the image data and the input log information in a job log management server on a network; a program code for executing a second transmission step of, when performing an output process by inputting a request to output the image data registered in the storage unit, transmitting output log information describing identification information to identify an output image, so as to register the output log information in the job log management server; and a program code for executing a third transmission step of, when a request for image data represented by identification information is received from the job log management server as a result of transmission in the second transmission step, transmitting the image data represented by the identification information in the storage unit, so as to register the image data in the job log management server.

According to yet another aspect of the present invention, an electronic document management system comprising an image output apparatus which outputs an image generated on the basis of a job to input an image, and a job log management server which manages a log of a job processed by the image output apparatus, the image output apparatus comprises a registration unit which, when a new job is received, registers image data generated on the basis of the job in a storage unit; a first transmission unit which transmits the registered image data and input log information representing that a job describing identification information to identify the registered image has been input, so as to register the image data and the input log information in the job log management server; a second transmission unit which, when performing an output process by inputting a request to output the image data registered in the storage unit, transmits output log information describing identification information to identify an output image, so as to register the output log information in the job log management server; and a third transmission unit which, when a request for image data represented by identification information is received from the job log management server as a result of transmission by the second transmission unit, transmits the image data represented by the identification information in the storage unit, so as to register the image data in the job log management server.

The present invention can provide a technique capable of solving at least one of the above-described problems while decreasing the capacity of the storage area of log information and log image data and reducing the data transfer load.

Further features of the present invention will become apparent from the following description of exemplary embodiments (with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a view showing an example of data representing log information generated by the digital multi-function peripheral;

DESCRIPTION OF THE EMBODIMENTS

Preferred embodiments of the present invention will be described in detail below with reference to the accompanying drawings. Building components described in the embodiments are merely examples and may not be construed to limit the scope of the present invention to only them.

First Embodiment

<General Description>

A network document management system including an image output apparatus will be exemplified as the first embodiment of an image output apparatus according to the present invention. A digital multi-function peripheral in the following description corresponds to the image output apparatus. The first embodiment will explain a technique of maintaining consistency between log information and log image data in a document management server while decreasing the capacity of the storage area of log information and log image data and reducing the data transfer load.

<Hardware Configuration View of Overall System>

Figure 1:
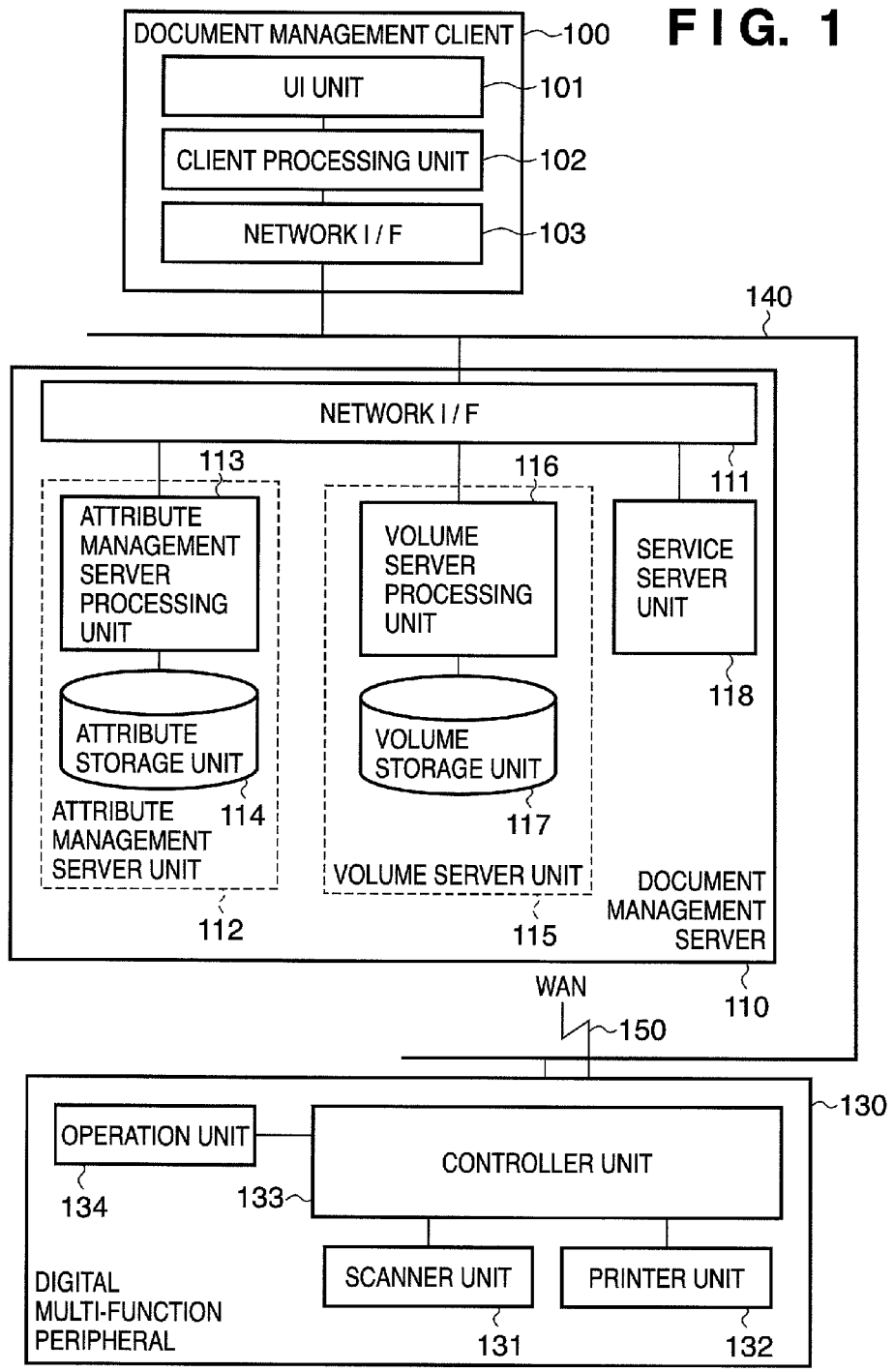
FIG. 1 is a block diagram of an overall network document management system according to the first embodiment.

FIG. 1 is a block diagram of an overall network document management system according to the first embodiment. The network document management system comprises a document management client 100, document management server 110, and digital multi-function peripheral 130, which are connected to each other by a network 140. In the following description, the document management client 100, document management server 110, and digital multi-function peripheral 130 communicate with each other using TCP/IP.

The document management client 100 is a client in the network document management system, and searches for and displays document information managed by the document management server 110. The document management client 100 comprises a user interface (UI) unit 101, client processing unit 102, and network I/F 103. The user interface (UI) unit 101 accepts operator instructions relevant to functions of the document management client 100 such as search and display of document information. The user interface (UI) unit 101 provides the operator with various types of information such as the process result. More specifically, the user interface (UI) unit 101 includes a display typified by a CRT or liquid crystal display, and an input device such as a keyboard or pointing device. The client processing unit 102 includes a CPU, memory, and the like. The client processing unit 102 executes processes by functions of the document management client 100 such as search and display of document information. Upon occurrence of a process for the document management server 110, the client processing unit 102 transmits various request commands to the document management server 110 via the network I/F 103, and receives responses to them.

The document management server 110 manages "job log information" and "job log image data" transmitted from the digital multi-function peripheral 130. The document management server 110 comprises a network I/F 111, attribute management server unit 112, volume server unit 115, and service server unit 118. The attribute management server unit 112, volume server unit 115, and service server unit 118 may be built in one personal computer (PC) or a plurality of PCs connected by the network 140. The network I/F 111 connects to the network 140 to perform a process based on a network protocol such as TCP/IP.

The attribute management server unit 112 manages log information and log image data corresponding to a job as a document stored in a hierarchical folder. For this purpose, the attribute management server unit 112 manages the inclusion relationship of a folder, document, and page, their attributes, and the like. The attribute management server unit 112 comprises an attribute management server processing unit 113 and attribute storage unit 114. The attribute management server processing unit 113 includes a CPU, memory, and the like. The attribute management server processing unit 113 receives a request command from the client processing unit 102 or service server unit 118 via the network I/F 111. The attribute management server processing unit 113 performs processes such as update and search for the attribute storage unit 114 in correspondence with the request command, and transmits the process result to the client processing unit 102 or service server unit 118. The attribute storage unit 114 stores a folder attribute, document attribute, log information, page attribute, and the like, and is formed from a large-capacity storage such as a hard disk.

The volume server unit 115 accumulates and manages log image data corresponding to information managed by the attribute management server unit 112. The volume server unit 115 comprises a volume server processing unit 116 and volume storage unit 117. The volume server processing unit 116 includes a CPU, memory, and the like, and receives a request command from the client processing unit 102 or service server unit 118 via the network I/F 111. The volume server processing unit 116 performs processes such as update and data acquisition for the volume storage unit 117 in correspondence with the request command, and transmits the process result to the client processing unit 102 or service server unit 118. The volume storage unit 117 stores log image data and the like, and is formed from a large-capacity storage such as a hard disk.

The service server unit 118 includes a CPU, memory, and the like. The service server unit 118 receives a request command from the digital multi-function peripheral 130 via the network I/F 111 and executes a corresponding process. Upon occurrence of a process to the attribute management server unit 112 or volume server unit 115, such as registration of log information and log image data of a job, the service server unit 118 transmits various request commands to the attribute management server unit 112 or volume server unit 115 via the network I/F 111. The service server unit 118 receives responses to the request commands, and transmits the process result to the digital multi-function peripheral 130.

The digital multi-function peripheral 130 is an image forming apparatus having multiple functions such as copy, scan, print, and FAX. The digital multi-function peripheral 130 comprises a scanner unit 131 serving as an image input device, a printer unit 132 serving as an image output device, a controller unit 133, and an operation unit 134 serving as a user interface. The scanner unit 131, printer unit 132, and operation unit 134 are connected to the controller unit 133, and the controller unit 133 is connected to the network (LAN) 140 and a public line (WAN) 150.

The controller unit 133 executes the processes of a copy job, print job, and the like based on information input from the operation unit 134. The controller unit 133 provides the operation unit 134 with information such as a device status and job status, and stores log information and log image data of a generated job. Upon occurrence of a process for the document management server 110, the controller unit 133 transmits a request command to the service server unit 118. The controller unit 133 receives a response to the request command, and provides the operation unit 134 with information acquired from the document management server 110. The arrangement of the digital multi-function peripheral 130 will be described in detail later.

<Functional Block Diagram>

Figure 2:
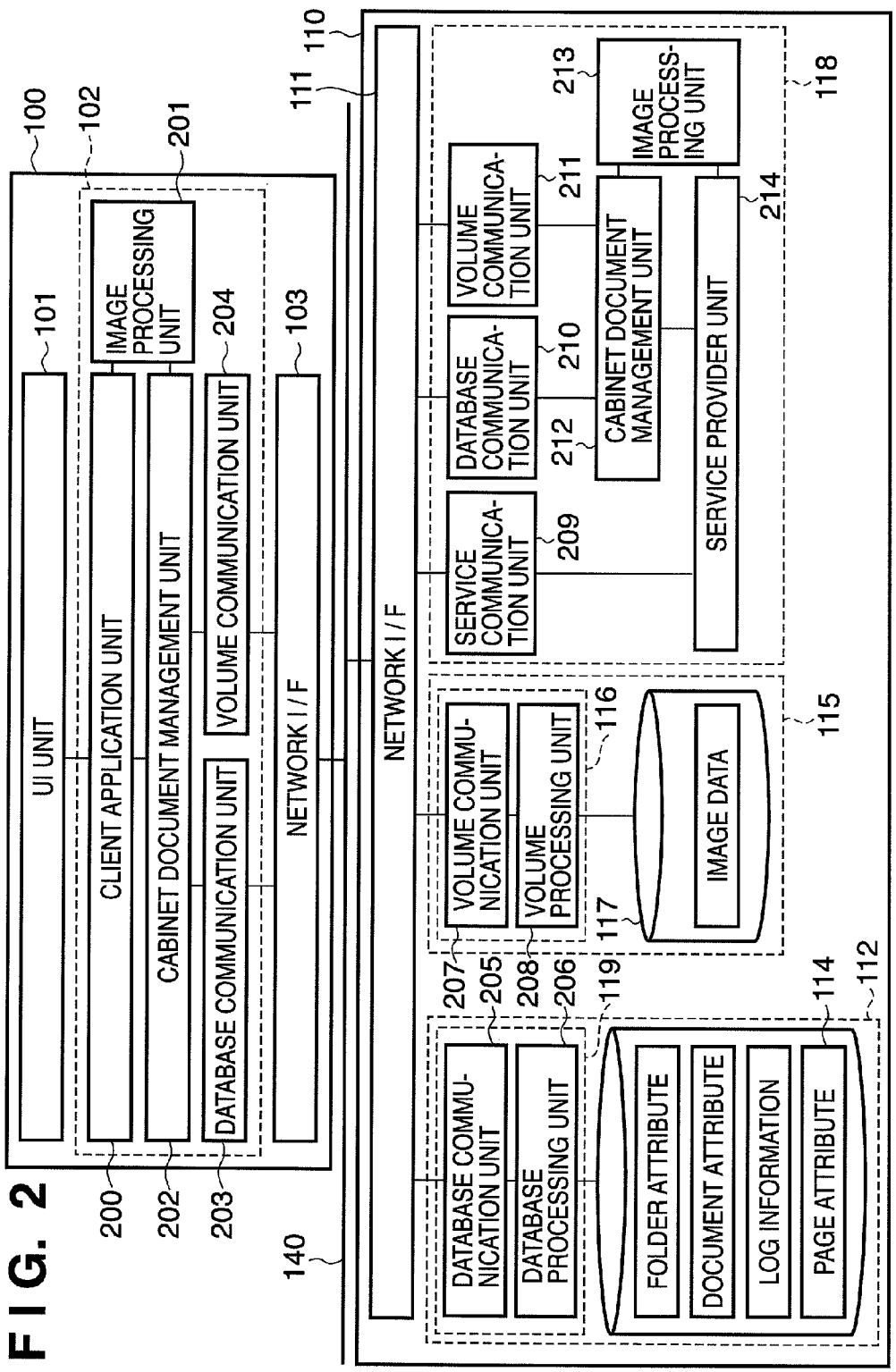
FIG. 2 is a functional block diagram of a document management client and document management server in the network document management system according to the first embodiment.

FIG. 2 is a functional block diagram of the document management client and document management server in the network document management system according to the first embodiment. In FIG. 2, the same reference numerals as those in FIG. 1 denote the same parts.

Document Management Client

The client processing unit 102 comprises a client application unit 200, image processing unit 201, cabinet document management unit 202, database communication unit 203, and volume communication unit 204. The client application unit 200 executes processes by functions of the document management client 100 in accordance with an instruction from the user interface (UI) unit 101, and controls the display window on the UI unit 101. Upon occurrence of a process for the attribute management server unit 112 or volume server unit 115, the client application unit 200 supplies the request to the cabinet document management unit 202, and receives the process result from it. The image processing unit 201 executes image processes such as image data decompression/compression, color space conversion, undercolor removal, enlargement/reduction, and rotation in accordance with requests from the client application unit 200 and cabinet document management unit 202.

The cabinet document management unit 202 executes requests to the attribute management server unit 112 and volume server unit 115 using an object model made up of a cabinet, folder, document, and page. Upon occurrence of a process such as reference or update to the folder attribute, document attribute, log information, or page attribute, the cabinet document management unit 202 supplies the request to the database communication unit 203, and receives the process result from it. Upon occurrence of a process such as registration, deletion, or acquisition of log image data, the cabinet document management unit 202 supplies the request to the volume communication unit 204, and receives the process result from it.

The database communication unit 203 transmits a request command addressed to the attribute management server unit 112 to a database communication unit 205 via the network I/F 103, and receives the response command from the database communication unit 205. The request command uses a database manipulation language such as SQL (Structured Query Language). The volume communication unit 204 transmits a request command addressed to the volume server unit 115 to a volume communication unit 207 via the network I/F 103, and receives the response command from the volume communication unit 207. The communication utilizes RPC (Remote Procedure Call).

Document Management Server

The attribute management server processing unit 113 comprises the database communication unit 205 and a database processing unit 206. The database communication unit 205 receives a request command addressed to the attribute management server unit 112 from the database communication unit 203 or a database communication unit 210 via the network I/F 111. The database communication unit 205 supplies the request to the database processing unit 206, and transmits the process result as a response command to the database communication unit 203 or database communication unit 210. The database processing unit 206 performs processes such as update and search for the attribute storage unit 114 serving as a database file. The database employs RDBMS (Relational DataBase Management System), and manages the inclusion relationship of a folder, document, and page, and their attributes. The table structure in the database file will be described later with reference to FIG. 3.

The volume server processing unit 116 comprises the volume communication unit 207 and a volume processing unit 208. The volume communication unit 207 receives a request command addressed to the volume server unit 115 from the volume communication unit 204 or a volume communication unit 211 via the network I/F 111. The volume communication unit 207 supplies the request to the volume processing unit 208, and transmits the process result as a response command to the volume communication unit 204 or volume communication unit 211. The volume processing unit 208 performs processes such as update and data acquisition for the volume storage unit 117 serving as a volume file. The data structure in the volume file will be described later with reference to FIG. 4.

The service server unit 118 comprises a service communication unit 209, the database communication unit 210, the volume communication unit 211, a cabinet document management unit 212, an image processing unit 213, and a service provider unit 214. The service communication unit 209 receives a request command addressed to the document management server 110 from the digital multi-function peripheral 130 via the network I/F 111. The request command employs, for example, the SOAP protocol on the HTTP protocol. The service communication unit 209 supplies the request to the service provider unit 214, and transmits the process result as a response command to the digital multi-function peripheral 130.

The service provider unit 214 executes a process in accordance with a request from the service communication unit 209, and sends back the process result. Upon occurrence of a process for the attribute management server unit 112 or volume server unit 115, such as registration of document information, update of an attribute, or search, the service provider unit 214 supplies the request to the cabinet document management unit 212, and receives the process result from it. The service provider unit 214 receives log information and log image data of a job from the digital multi-function peripheral 130 via the service communication unit 209. After temporarily saving the log information and log image data in the hard disk drive, the service provider unit 214 requests the cabinet document management unit 212 to register the log information and log image data as a document, and receives the process result. When executing a resolution conversion process or data conversion process on log image data, the service provider unit 214 reads out the log image data from the hard disk drive. The service provider unit 214 requests the cabinet document management unit 212 to register the log information and log image data as a document, and receives the process result.

The image processing unit 213 performs image processes such as image data decompression/compression, color space conversion, undercolor removal, resolution conversion, rotation, region segmentation, and character recognition in accordance with requests from the service provider unit 214 and cabinet document management unit 212. The functional configurations of the database communication unit 210, volume communication unit 211, and cabinet document management unit 212 are the same as those in the document management client, and a description thereof will not be repeated.

Figure 3:
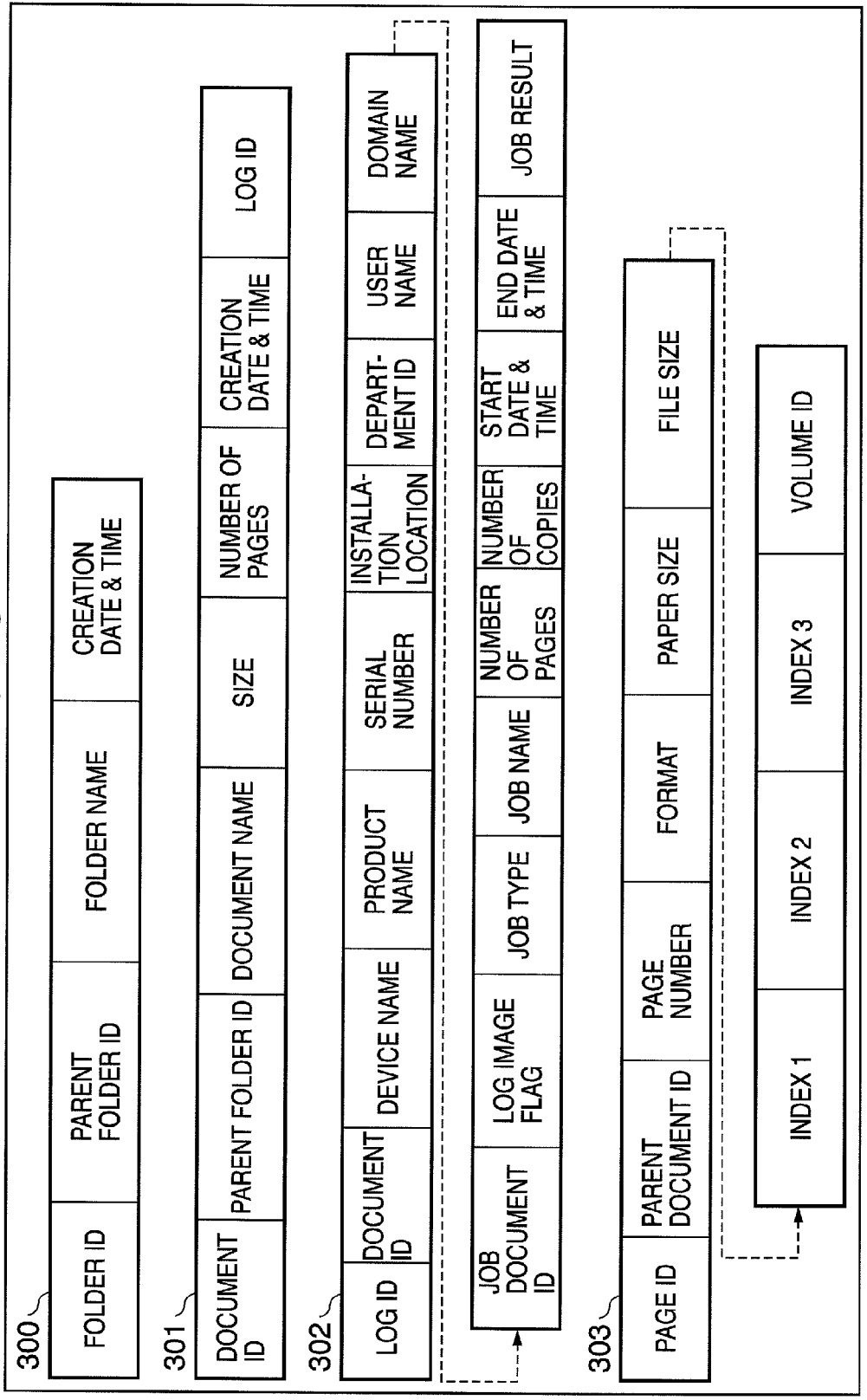
FIG. 3 is a view showing an example of the table definition of an attribute storage unit 114.

FIG. 3 is a view showing an example of the table definition of the attribute storage unit 114.

A folder management table 300 includes a folder ID for identifying a folder, a parent folder ID for identifying a parent folder, a folder name, and a creation date & time.

A document management table 301 includes a document ID for identifying a document, a parent folder ID for identifying a parent folder, a document name, a size, the number of pages, a creation date & time, and a log ID. The log ID is information for identifying a corresponding log.

A log information management table 302 includes a log ID for identifying a log, device information, user information, job information, and a document ID for identifying a corresponding document. The device information includes a device name, product name, serial number, and installation location. The user information includes a department ID, user name, and domain name. The job information includes a job document ID, log image flag, job type, job name, the number of pages, the number of copies, start date & time, end date & time, and job result. The job document ID is a unique value representing log image data of an input job. The log image flag indicates the presence/absence of log image data. When the log image flag indicates the absence of log image data, the job document ID indicates log image data of another input job.

A page management table 303 includes a page ID for identifying a page, a parent document ID for identifying a parent document, a page number, and a format for identifying the file format of page data. The page management table 303 also includes a paper size for identifying a paper size in the case of image data, and a file size. Further, the page management table 303 includes indices 1 to 3 for searching for a page, and a volume ID for identifying image data managed by the volume server unit 115.

Figure 4:
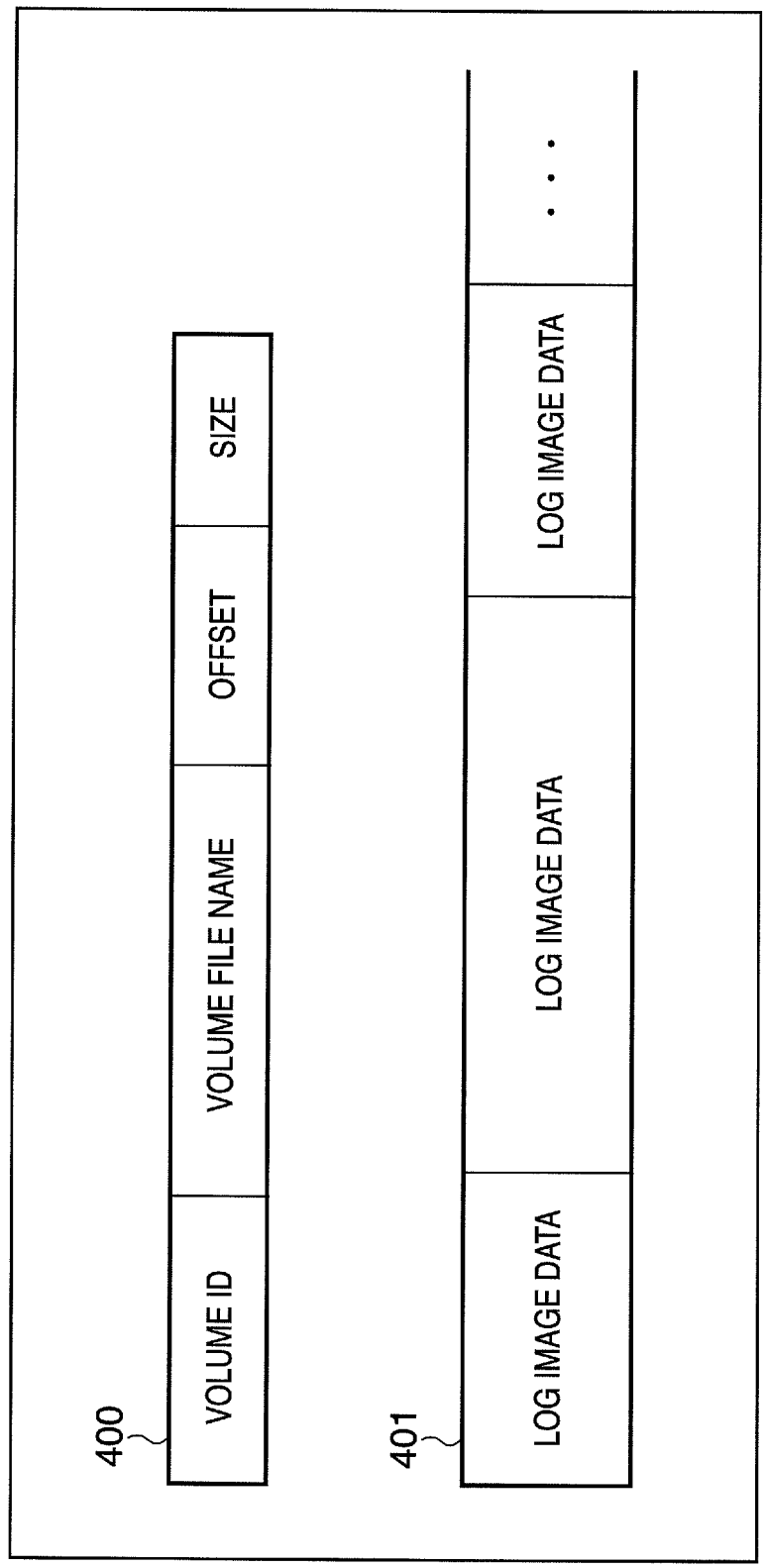
FIG. 4 is a view showing an example of the data structure of a volume storage unit 117.

FIG. 4 is a view showing an example of the data structure of the volume storage unit 117.

A volume management file 400 includes a volume ID for identifying data, a file name, an offset serving as a data storage start position, and a data size. The file name is information for identifying a volume storage file which stores data. A volume storage file 401 successively stores log image data.

<Hardware Configuration of Digital Multi-Function Peripheral>

Figure 5:
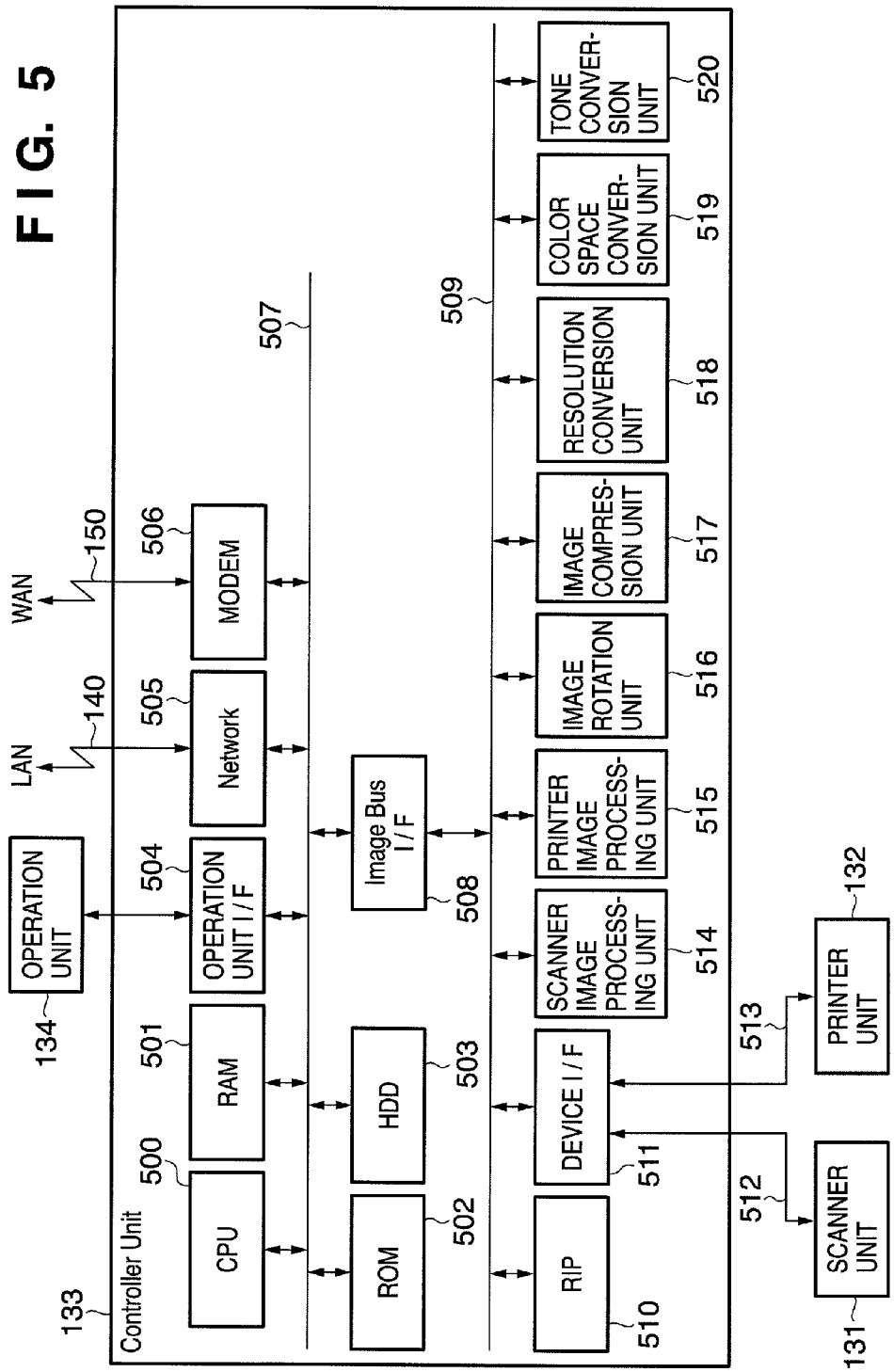
FIG. 5 is a detailed block diagram of a digital multi-function peripheral in the network document management system according to the first embodiment.

FIG. 5 is a detailed block diagram of the digital multi-function peripheral in the network document management system according to the first embodiment. In FIG. 5, the same reference numerals as those in FIG. 1 denote the same parts.

The controller unit 133 is connected to the scanner unit 131 serving as an image input device and the printer unit 132 serving as an image output device, and also connected to the network (LAN) 140 and public line (WAN) 150. The controller unit 133 inputs and outputs image information and device information.

A CPU 500 is a controller which controls the overall system. A RAM 501 is a work memory used when the CPU 500 executes various control programs. The RAM 501 is also used as an image memory (buffer) for temporarily storing input image data. A ROM 502 stores various control programs of the system. A hard disk drive (HDD) 503 stores system software, log information and log image data of a job, and the like. An operation unit I/F 504 is an interface with the operation unit 134, and outputs window data to be displayed on the operation unit 134 to the operation unit 134. Also, the operation unit I/F 504 notifies the CPU 500 of information input by an operator via the operation unit 134. A network unit (Network) 505 connects to the network (LAN) 140 to input/output information. A modem (MODEM) 506 connects to the public line (WAN) 150 to input/output information. These devices are arranged on a system bus 507.

An image bus (Image Bus) I/F 508 is a bus bridge which connects the system bus 507 to an image bus 509 for transferring image data at high speed, and converts the data structure. The image bus 509 is formed from, for example, a PCI bus or IEEE1394 bus.

The following devices are arranged on the image bus 509. A raster image processor (RIP) 510 generates bitmap image based on a page description language (PDL) code. A device I/F 511 is a functional unit which communicates with the scanner unit 131 and printer unit 132 serving as image input and output devices. More specifically, the device I/F 511 connects the scanner unit 131 and printer unit 132 via an image input unit interface 512 and printer unit interface 513 to perform synchronous/asynchronous conversion of image data. A scanner image processing unit 514 corrects, processes, and edits input image data. The scanner image processing unit 514 has a function of determining from the color saturation signal of image data whether input image data represents a color or monochrome document, and holding the determination result. A printer image processing unit 515 corrects, processes, and edits output image data.

An image rotation unit 516 rotates image data in cooperation with the scanner image processing unit 514 at the same time as scanning of image by the scanner unit 131, and stores the resultant image data in a memory. The image rotation unit 516 can rotate image data in the memory and store it in the memory, or print out image data in the memory while rotating it in cooperation with the printer image processing unit 515. An image compression unit 517 executes JPEG compression/decompression for multivalued image data, and JBIG, MMR, MR, or MH compression/decompression for binary image data. A resolution conversion unit 518 converts the resolution of image data in the memory and stores the resultant image data in the memory. A color space conversion unit 519 converts, for example, image data in the YUV space in the memory into image data in the Lab space by matrix operation, and stores the converted image data in the memory. A tone conversion unit 520 converts, for example, 8-bit (256-tone) image data in the memory into a 1-bit value (two tones) by a method such as error diffusion processing, and stores the converted image data in the memory. The image rotation unit 516, image compression unit 517, resolution conversion unit 518, color space conversion unit 519, and tone conversion unit 520 can operate in cooperation with each other. For example, image rotation and resolution conversion of image data in the memory can be achieved by linking the image rotation unit 516 and resolution conversion unit 518. These processes can successively proceed without the mediacy of the memory.

Figure 6:
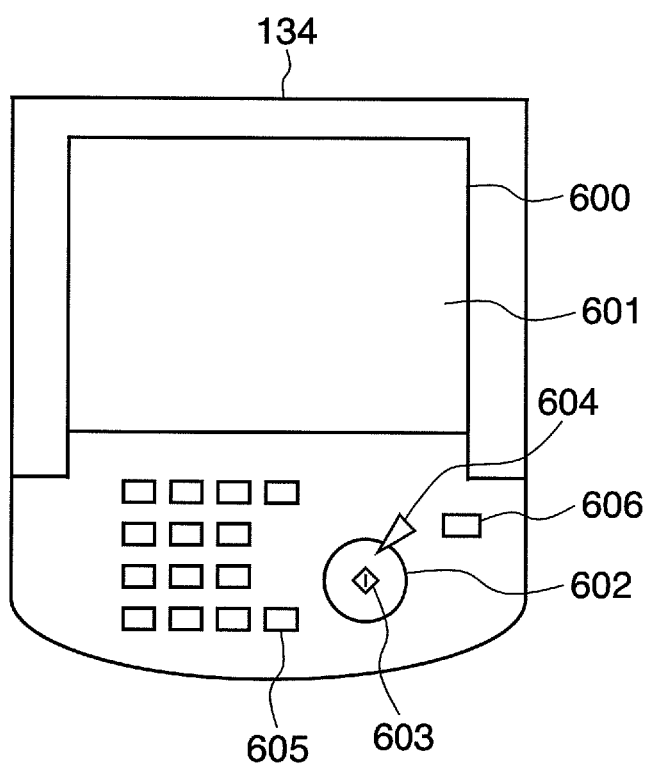
FIG. 6 is a view showing the outer appearance of an operation unit 134 of the digital multi-function peripheral.

FIG. 6 is a view showing the outer appearance of the operation unit 134 of the digital multi-function peripheral.

A touch panel 600 is formed by covering an LCD display with a touch panel sheet 601. In response to a control program executed by the CPU 500, a system operation window and soft keys appear on the LCD display. For example, when the user touches a portion where a soft key is displayed, the CPU 500 in the controller unit 133 is notified of position information of the touch panel. A start key 602 is used to start a document image read operation. An LED 603 in two colors, green and red, is arranged at the center of the start key 602, and the color of the LED 603 represents whether the start key 602 is available. A stop key 604 designates the stop of an operation in progress. An ID key 605 is used to input a user ID. A reset key is used to initialize settings.

<Functional Arrangement of Digital Multi-Function Peripheral>

Figure 7:
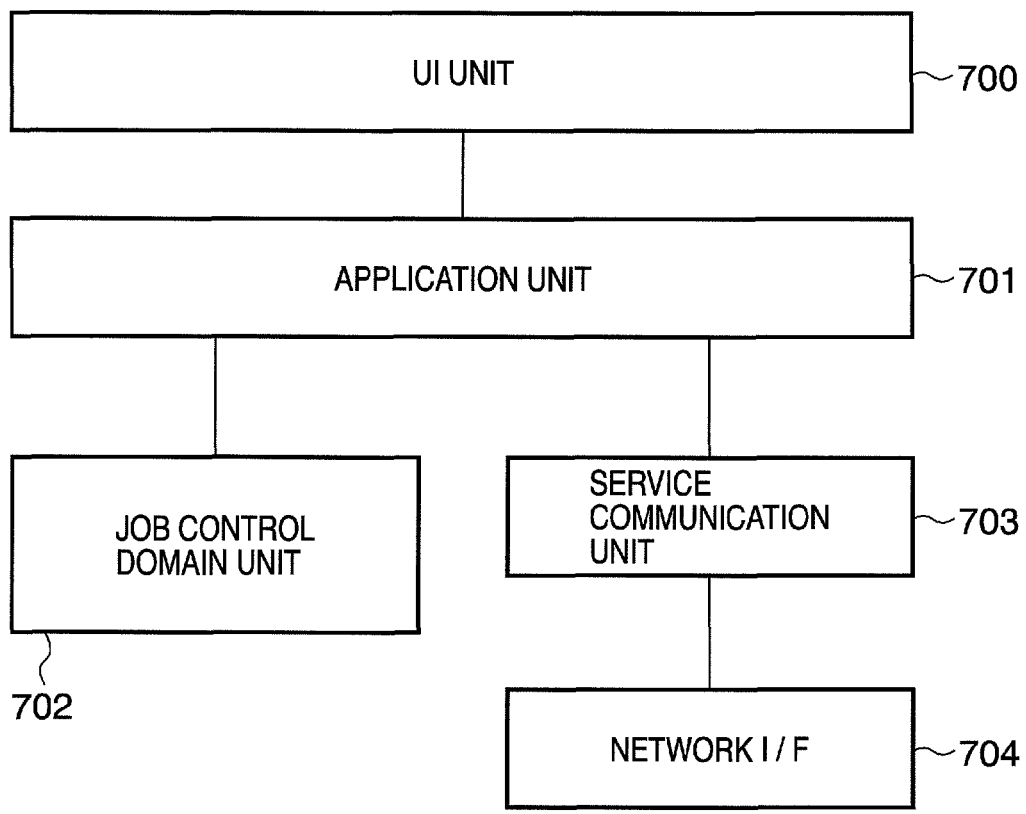
FIG. 7 is a functional block diagram of the digital multi-function peripheral implemented by various control software programs.

FIG. 7 is a functional block diagram of the digital multi-function peripheral implemented by various control software programs.

A user interface (UI) unit 700 supplies information input from an operator to an application unit 701. The user interface (UI) unit 700 receives the process result from the application unit 701, and generates a window to be displayed on the operation unit 134.

The application unit 701 performs a process in accordance with a request from the user interface (UI) unit 700. When copying is requested, the application unit 701 inputs a copy job together with copy settings designated by a job control domain unit 702. The application unit 701 receives information such as a device status and job status from the job control domain unit 702. When transmitting log information and log image data of a job to the document management server 110, the application unit 701 receives them from the job control domain unit 702. The application unit 701 requests a service communication unit 703 to transmit the log information and log image data of the job, and receives the process result.

The job control domain unit 702 controls various jobs such as a scan job, copy job, print job, and FAX job. For example, when a copy job is input, the job control domain unit 702 controls to scan a document by the scanner unit 131 based on designated copy settings, and print the scanned image data by the printer unit 132.

Upon reception of an "input job" to input an image, such as copy, print, or scan, the job control domain unit 702 generates image data based on the job. The job control domain unit 702 generates log image data together with log information of the job, and stores a variety of generated data in the HDD 503. The log image data may be generated by directly copying image data of a job, or converting the image data into a predetermined resolution, color space, or compression scheme. Upon reception of an "output job" to output a past input job by printing or FAX transmission using a so-called BOX function, the job control domain unit 702 generates only log information without generating log image data. The service communication unit 703 transmits a request command addressed to the document management server 110 to the service communication unit 209 in the document management server 110 via a network I/F 704, and receives the response.

Figure 8:
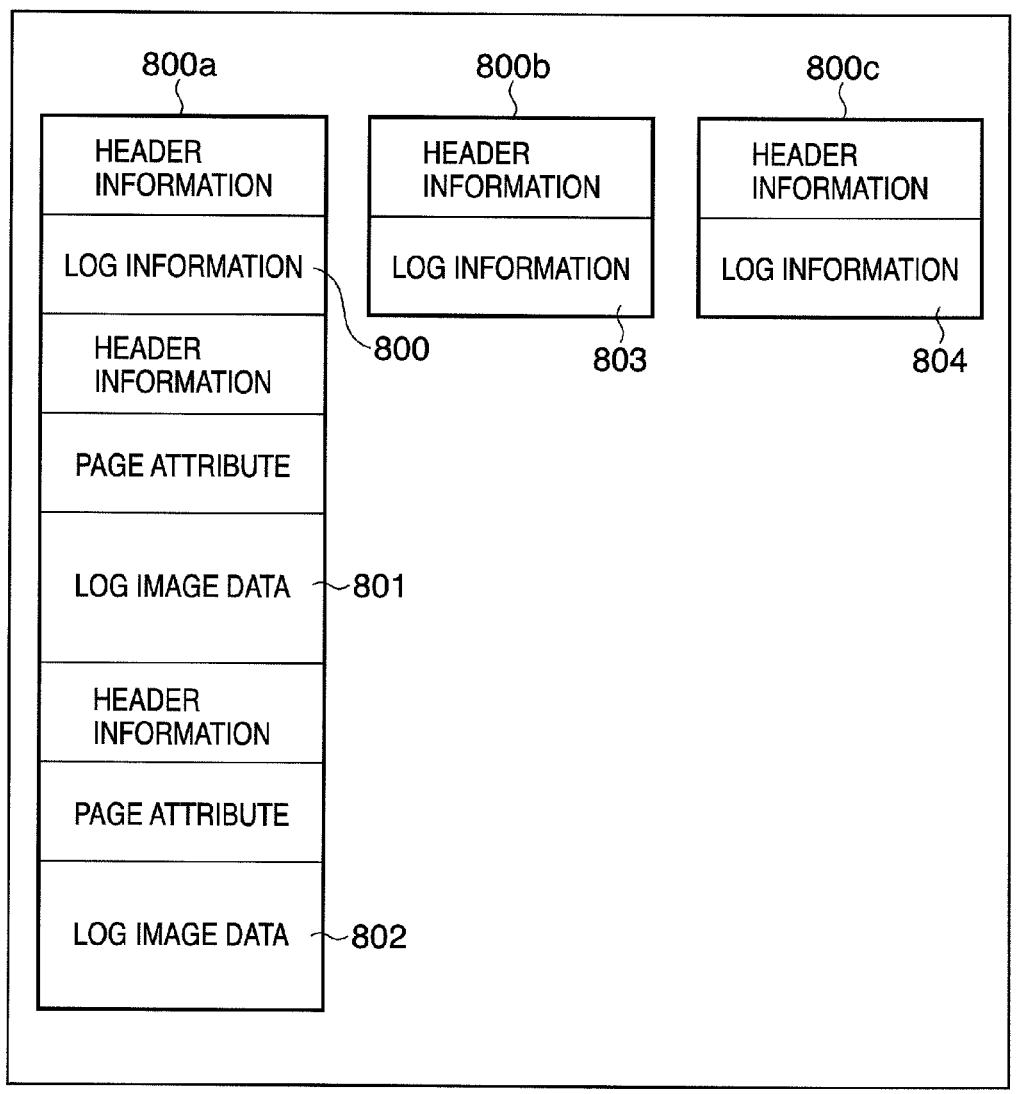
FIG. 8 is a view showing an example of the data structure of job log data generated by the digital multi-function peripheral.

FIG. 8 is a view showing an example of the data structure of job log data generated by the digital multi-function peripheral.

A data structure 800a represents an example of job log data of an input job for a 2-page document image. In this example, log information 800 of an input job, and log image data 801 and 802 of respective pages are recorded successively. The log information and log image data are recorded each with header information made up of a format version, data size, and the like. The log image data is recoded with a page attribute made up of an image size, resolution, compression scheme, and the like.

Data structures 800b and 800c represent examples of the data structures of job log data of an output job. In this example, pieces of log information 803 and 804 are recorded.

FIG. 9 is a view showing an example of data representing log information generated by the digital multi-function peripheral.

In this example, log information is expressed as XML data and formed from logInformation elements. The logInformation elements include:

deviceInformation element: represents device information such as a device name and serial number userInformation element: represents user information such as a department ID and user name jobInformation element: represents job information such as a job type, job name, and start date & time The documentID element in the jobInformation element is a job document ID in the above-described table 302, and records a unique value representing log image data of an input job. The documentFlag is a log image flag, and records "yes" when log image data exists and "no" when no log image data exists. In the case of log information of an output job, the log image flag is "no". The job document ID of the output job represents log image data of a corresponding input job.

<Data Transmission Process Sequence (Digital Multi-Function Peripheral)>

Figure 10:
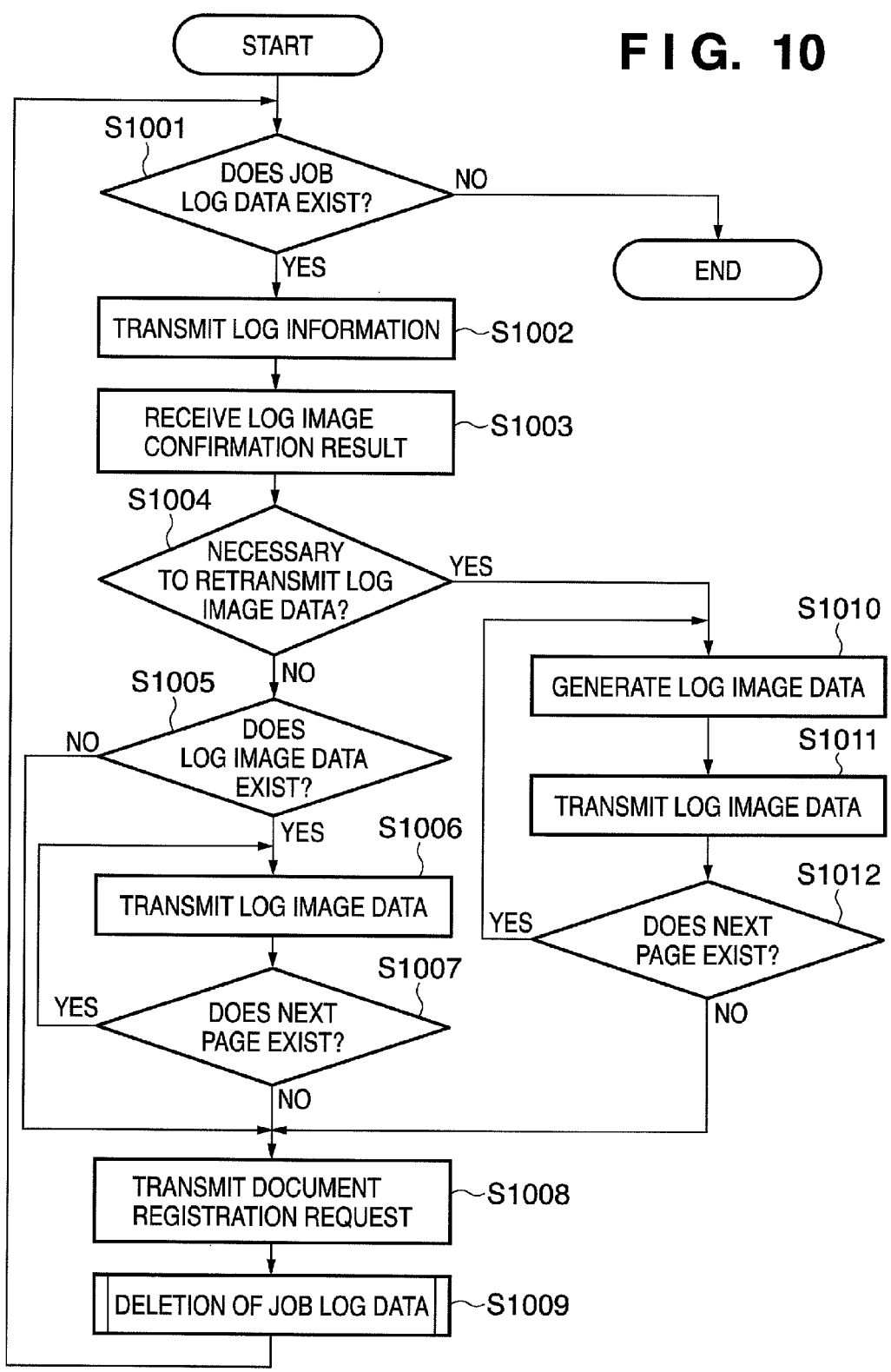
FIG. 10 is a flowchart when the digital multi-function peripheral transmits job log data to the document management server.

FIG. 10 is a flowchart when the digital multi-function peripheral transmits job log data to the document management server. The following sequence is implemented by executing a control program by the CPU 500 in the digital multi-function peripheral. Also, the following sequence is executed in a predetermined cycle.

In step S1001, the digital multi-function peripheral checks whether one or more job log data not transmitted to the document management server exist in the HDD 503. If one or more job log data exist, the process advances to step S1002; if no job log data exists, the process advances to step S1013 and ends. That is, when the digital multi-function peripheral receives and executes a job after this sequence is executed, the process advances to step S1002.

In step S1002, the digital multi-function peripheral transmits log information in the job log data to the document management server.

In step S1003, the digital multi-function peripheral receives a log image confirmation result from the document management server. Based on the log information received in step S1002, the document management server determines whether log image data not stored in the volume storage unit 117 exists. The document management server transmits the determination result to the digital multi-function peripheral. A detailed operation of the document management server will be described later. In this case, if the log information transmitted in step S1002 corresponds to an output job and there is no log image data corresponding to the documentID in the log information, the document management server determines that no log image data exists. This is because it is apparent that log image data is separately transmitted (S1006 to be described later) when the log information transmitted in step S1002 corresponds to an input job.

In step S1004, the digital multi-function peripheral determines, based on the log image confirmation result received in step S1003, whether it needs to retransmit log image data of the job to the document management server, that is, whether to retransmit log image data which was transmitted before. If the digital multi-function peripheral determines that it needs to retransmit the log image data (YES in S1004), the process advances to step S1010; if No, the process advances to step S1005.

In step S1010, the digital multi-function peripheral generates log image data from image data corresponding to the job document ID (documentID) corresponding to the log image data which is determined to be retransmitted. Since the digital multi-function peripheral has executed an output job having the job document ID, it surely saves image data having the job document ID.

In step S1011, the digital multi-function peripheral transmits the log image data generated in step S1010 to the document management server. The digital multi-function peripheral repetitively executes steps S1010 and S1011 until the target page reaches the final page (1012). After transmitting all pages, the process advances to step S1008.

In step S1005, the digital multi-function peripheral determines whether log image data exists in the current job log data. If the log image data exists, the process advances to step S1008; if no log image data exists, the process advances to step S1006. In this case, log image data exists when a log corresponding to an input job exists in the job log data.

In step S1006, the digital multi-function peripheral transmits the log image data to the document management server. The digital multi-function peripheral repetitively executes step S1006 until the target page reaches the final page (1007). After transmitting all pages, the process advances to step S1008.

In step S1008, the digital multi-function peripheral transmits a request to the document management server to register the log information transmitted in step S1002. When log image data has been transmitted, the digital multi-function peripheral also transmits a request to register it.

In step S1009, the digital multi-function peripheral deletes the processed job log data.

The digital multi-function peripheral repetitively executes these steps until all job log data are transmitted, and then the process ends (S1013).

The above-described process can prevent omission of log image data corresponding to the job document ID of log information of an output job from the management server. In other words, this process can maintain consistency between log image data of an input job and the job document ID of log information of an output job.

<Data Reception Process Sequence (Document Management Server)>

Data reception by the document management server in correspondence with the above-described data transmission by the digital multi-function peripheral will be explained.

Figure 11:
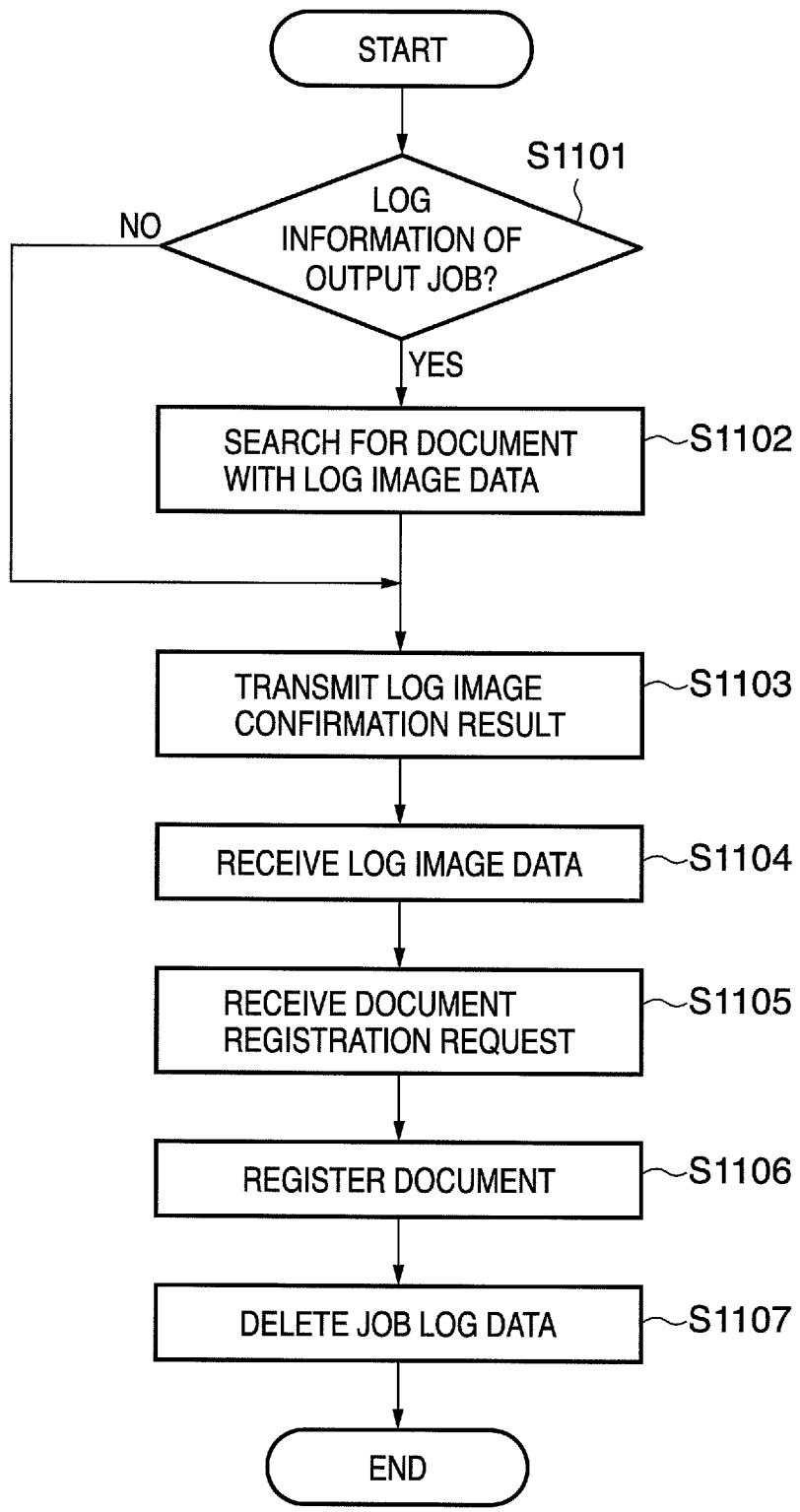
FIG. 11 is a flowchart when the document management server receives job log data from the digital multi-function peripheral.

FIG. 11 is a flowchart showing the flow when the document management server receives job log data from the digital multi-function peripheral. The following sequence is implemented by executing a control program by a CPU (not shown) in the document management server.

In step S1101, the document management server receives log information transmitted in step S1002 from the digital multi-function peripheral. The document management server determines whether the log information corresponds to an output job. If the log information corresponds to an output job, the process advances to step S1102; if the log information does not correspond to an output job, the process advances to step S1103.

In step S1102, the document management server determines whether the volume storage unit 117 stores log image data corresponding to the job document ID of the log information received in step S1101. More specifically, the document management server checks whether the attribute storage unit 114 serving as a database holds the same job document ID as that of the log information, and log information with corresponding log image data exists.

In step S1103, the document management server transmits the log image data confirmation result to the digital multi-function peripheral. More specifically, if the log information received in step S1101 corresponds to an output job, and log image data corresponding to the job document ID does not exist, the document management server requests retransmission of the log image data. In other cases, the document management server notifies the digital multi-function peripheral that the digital multi-function peripheral need not retransmit any log image data.

In step S1104, the document management server receives log image data. More specifically, the document management server receives, from the digital multi-function peripheral, log image data which corresponds to the job document ID and is determined in step S1103 to be retransmitted (corresponding to S1011). Alternatively, the document management server receives log image data corresponding to an input job (corresponding to S1006). In other cases, the document management server does not receive any log image data.

In step S1105, the document management server receives a document registration request from the digital multi-function peripheral. The document management server registers the log information received in step S1101 in the attribute storage unit 114 in association with the log image data (S1106). Note that the log image data may be one received in step S1104 or one already stored in the volume storage unit 117.

In step S1107, the document management server deletes the log information and log image data which have been received from the digital multi-function peripheral and are temporarily stored.

These steps are executed in correspondence with reception of each job log data.

<Image Data Deletion Process Sequence (Digital Multi-Function Peripheral)>

Figure 12:
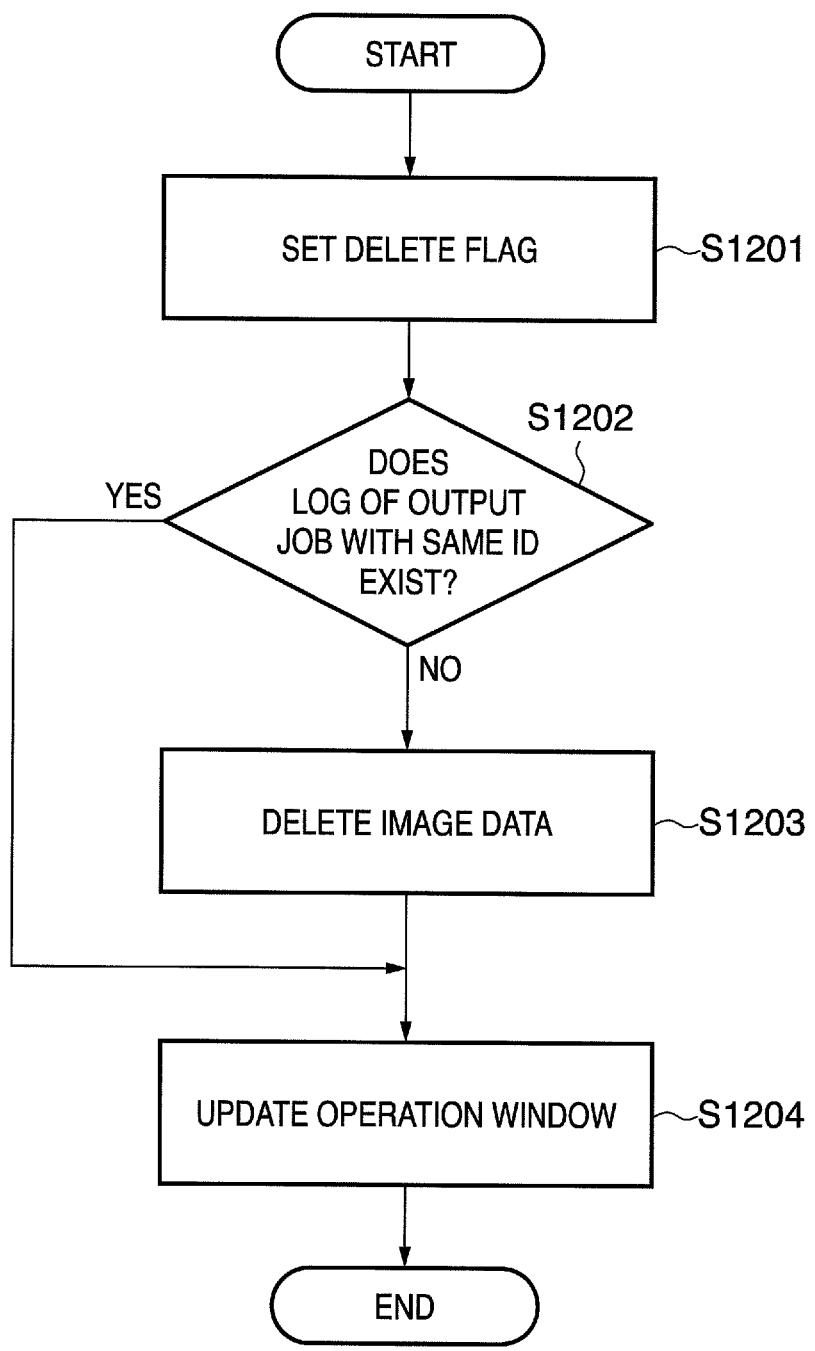
FIG. 12 is a flowchart when the digital multi-function peripheral deletes a group of image data corresponding to an input job.

FIG. 12 is a flowchart when the digital multi-function peripheral deletes a group of image data corresponding to an input job. The following sequence is implemented by executing a control program by the CPU 500 in the digital multi-function peripheral. Also, the following sequence starts when accepting, from an operator via the operation window of the digital multi-function peripheral, an instruction to delete a group of image data stored in the digital multi-function peripheral.

In step S1201, the digital multi-function peripheral sets a "delete flag" for a group of image data accepted in the operation window of the digital multi-function peripheral to indicate that the group of image data is to be deleted.

In step S1202, the digital multi-function peripheral determines whether it stores log information of an output job with the same job document ID as that corresponding to the group of image data. If the digital multi-function peripheral stores the log information, the process advances to step S1204; if it does not store the log information, the process advances to step S1203.

In step S1203, the digital multi-function peripheral deletes all image data of the group.

In step S1204, the digital multi-function peripheral updates the display of the operation window so as not to display a group of deleted image data and a group of image data for which the delete flag is set. That is, the digital multi-function peripheral controls not to execute an output job based on a group of image data using, for example, the BOX function.

<Deletion of Job Log Data>

Deletion of job log data in step S1009 of the flowchart in FIG. 10 will be explained in more detail.

Figure 13:
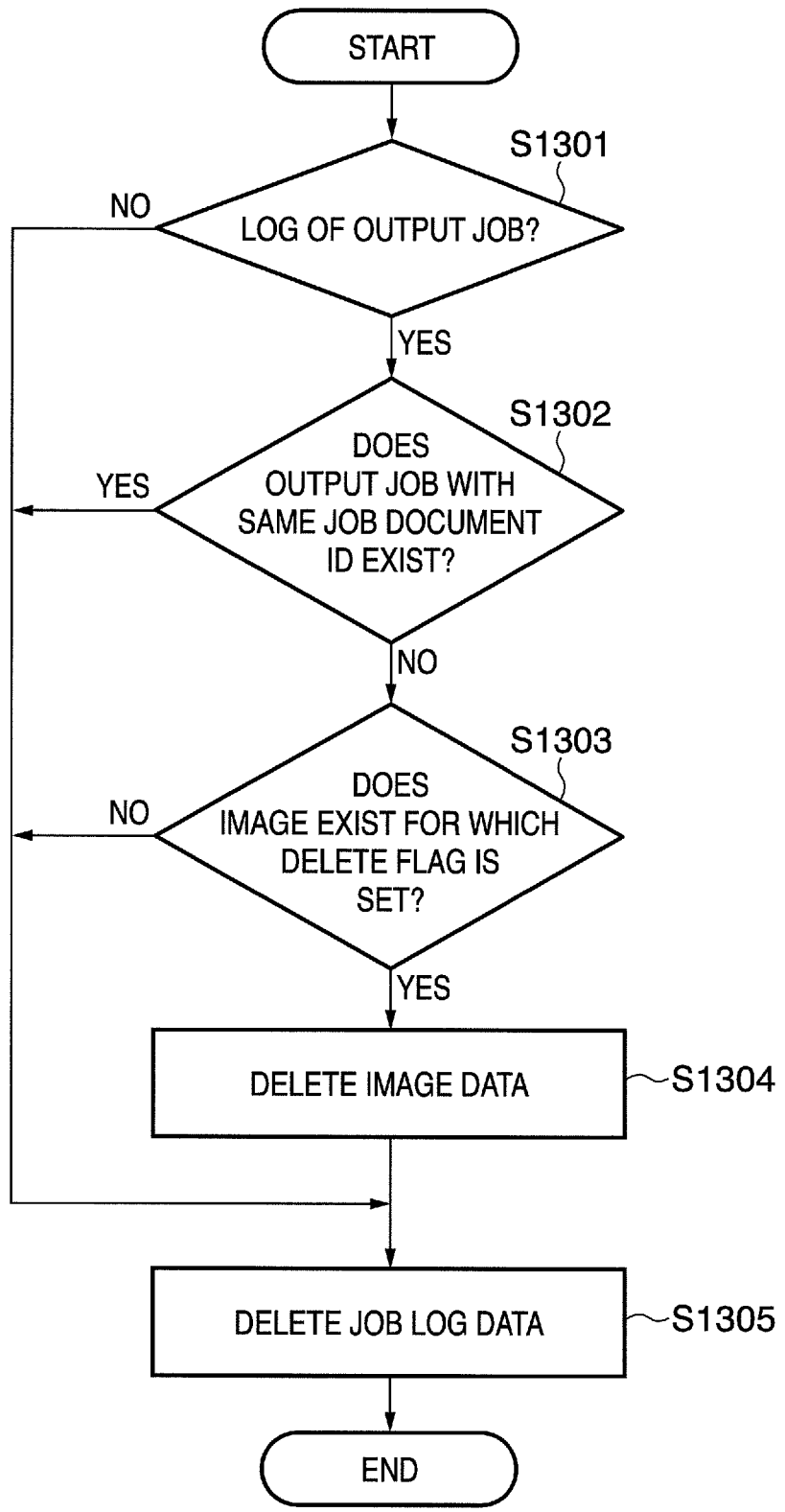
FIG. 13 is a detailed flowchart of deletion of job log data.
Figure 14:
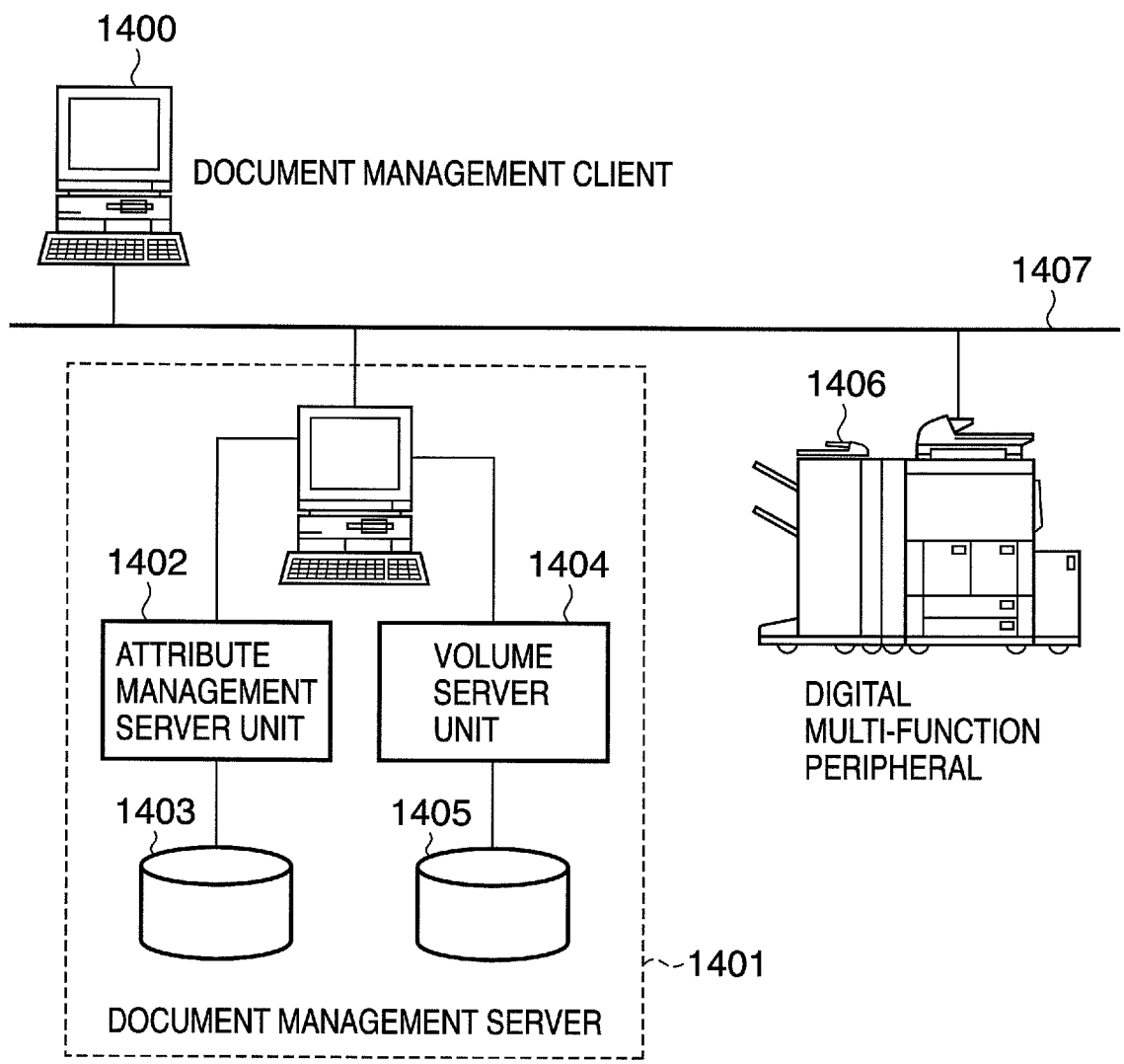
FIG. 14 is a view showing an example of the configuration of a network document management system (prior art).

FIG. 13 is a detailed flowchart of deletion of job log data.

In step S1301, the digital multi-function peripheral determines whether log information transmitted in step S1002 to the document management server corresponds to an output job. If the log information corresponds to an output job, the process advances to step S1302; if the log information does not correspond to an output job, the process advances to step S1305.

In step S1302, the digital multi-function peripheral determines whether job log data of an output job with the same job document ID as that of the log information exists in another untransmitted job log data. If the job log data exists in another untransmitted job log data, the process advances to step S1305; if no job log data exists, the process advances to step S1303.

In step S1303, the digital multi-function peripheral determines whether there is the job log of an input job which has the same job document ID as that of the log information and for which the delete flag is set. If the job log of an input job exists, the process advances to step S1304; if no job log exists, the process advances to step S1305.

In step S1304, the digital multi-function peripheral deletes all image data corresponding to the job log.

In step S1305, the digital multi-function peripheral deletes the job log data.

After the end of these steps, the process returns to step S1001 described above.

The aforementioned process can prevent erroneous deletion of image data while a job log with the same job ID as the job document ID of the image data exists.

As described above, the network document management system according to the first embodiment can prevent omission of log image data corresponding to the job document ID of log information of an output job from the document management server. That is, the network document management system can maintain consistency between log image data of an input job and the job document ID of log information of an output job.

The network document management system can also prevent erroneous deletion of image data from the digital multifunction peripheral while a job log with the same job ID as the job document ID of the image data exists.

Other Embodiments

The embodiment of the present invention has been described in detail. The present invention may be applied to a system including a plurality of devices or an apparatus formed by a single device.

The present invention is also achieved by supplying a program for implementing the functions of the above-described embodiment to a system or apparatus directly or from a remote place, and reading out and executing the supplied program codes by the system or apparatus. Therefore, program codes installed in the computer also fall within the technical scope of the present invention in order to implement functional processes of the present invention by the computer.

In this case, the program can take any form such as an object code, a program executed by an interpreter, or script data supplied to an OS as long as the program function is attained.

A recording medium for supplying the program includes a Floppy® disk, hard disk, optical disk (CD and DVD), magnetooptical disk, magnetic tape, nonvolatile memory card, and ROM.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-180373, filed Jun. 29, 2006, which is hereby incorporated by reference herein in its entirety.

What is claimed is:

1. An image processing apparatus, comprising:
a job execution unit configure to execute an input job for inputting image data and an output job for outputting the image data input by execution of the input job;
a first transmission unit configured to transmit, in a case where the job executed by the job execution unit is an input job, the image data input by the execution of the input job, so as to register the image data as log information of the input job in a server on a network;
a second transmission unit configured to, in a case where the job executed by the job execution unit is an output job, transmit identification information for identifying the image data input by executing the input job without transmitting the image data output by executing the output job, so as to register the identification information as log information of the output job in the server; and
a third transmission unit configured to transmit, in a case where, after the second transmitting unit transmits the identification information, a transmission request for requesting transmission of image data identified by identification information is received from the server, the image data identified by the identification information, so as to register the image data identified by the identification information as log information of the output job in the server,
wherein the transmission request is transmitted from the server to the image processing apparatus in a case where the image data identified by the identification information does not exist in the server.

2. The apparatus according to claim 1, wherein said first transmission unit and said third transmission unit transmit image data after converting the image data into not more than a predetermined resolution.

3. The apparatus according to claim 1, wherein the output job includes at least one of a job for printing the image data and a job for transmitting the image data by a facsimile transmission.

4. The apparatus according to claim 1, wherein the output job is executed based on an input received from an operation panel.

5. The apparatus according to claim 1, further comprising:
a storage unit configured to store the image data input by executing the input job;
a delete instruction accepting unit configured to accept an instruction to delete image data stored in the storage unit;
a search unit configured to search for the identification information until the information is transmitted to the server; and
a deletion control unit configured to cause, in a case where the delete instruction accepting unit accepts an instruction to delete predetermined image data, the search unit to search for the identification information the same as the predetermined image data, delete the image data in a case where the identification information the same as the predetermined image data does not exist, and suspend deletion of the image data in a case where the identification information identifying the same image data as the image data stored in the storage unit exists.

6. A method of controlling an image processing apparatus, the method comprising:
a job execution step of executing an input job for inputting image data and output job for outputting the image data input by execution of the input job;
a first transmission step of transmitting, in a case where the executed job unit is the input job, the image data input by the execution of the input job, so as to register the image data as log information of the input job in a server on a network;
a second transmission step of transmitting, in a case where the executed job is an output job, identification information for identifying the image data input by executing the input job without transmitting the image data output by executing the output job, so as to register the identification information as log information of the input job in the server; and
a third transmission step of transmitting, in a case where, after the second transmitting unit transmits the identification information, a transmission request for requesting transmission of image data identified by the identification information is received from the server, the image data identified by the identification information, so as to register the image data identified by the identification information as log information of the output job in the server, wherein the transmission request is transmitted from the server to the image processing apparatus in a case where the image data identified by the identification information does not exist in the server.

7. A non-transitory computer-readable storage medium storing a program of controlling an image processing apparatus, the program comprising:
- a program code to execute an input job for inputting image data and an output job for outputting the image data input by execution of the input job;
- a program code to transmit, in a case where the executed job is an input job, the image data input by the execution of the input job, so as to register the image data as log information of the input job in a server on a network;
- a program code to transmit, in a case where the executed job is an output job identification information for identifying the image data input by executing the input job without transmitting the image data output by executing the output job, so as to register the identification information as log information of the output job in the server; and
- a program code to transmit, in a case where, after the second transmitting unit transmits the identification information, a transmission request for requesting transmission of image data identified by the identification information is received from the server, the image data identified by the identification information, so as to register the image data identified by the identification information as log information of the output job in the server, wherein the transmission request is transmitted from the server to the image processing apparatus in a case where the image data identified by the identification information does not exist in the server.

8. A system comprising an image processing apparatus, and a server, the image processing apparatus comprising:
- a job execution unit configured to execute an input job for inputting image data and output job for outputting the image data input by execution of the input job;
- a first transmission unit configured to transmit, in a case where the job executed by the job execution unit is an input job, the image data input by the execution of the input job, so as to register the image data as log information of the input job in a server;
- a second transmission unit configured to, in a case where the job executed by the job execution unit is an output job, transmits identification information for identifying the image data input by executing the input job without transmitting the image data output by executing the output job, so as to register the identification information as log information of the output job in the server; and
- a third transmission unit configured to transmit, in a case where, after the second transmitting unit transmits the identification information, a transmission request for requesting transmission of image data identified by the identification information is received from the server, the image data identified by the identification information, so as to register the image data identified by the identification information as log information of the output job in the server, wherein the transmission request is transmitted from the server to the image processing apparatus in a case where the image data identified by the identification information does not exist in the server.

* * * * *